Jan. 16, 1945. M. LURIE 2,367,228
WATER RECTIFICATION
Filed Dec. 15, 1941
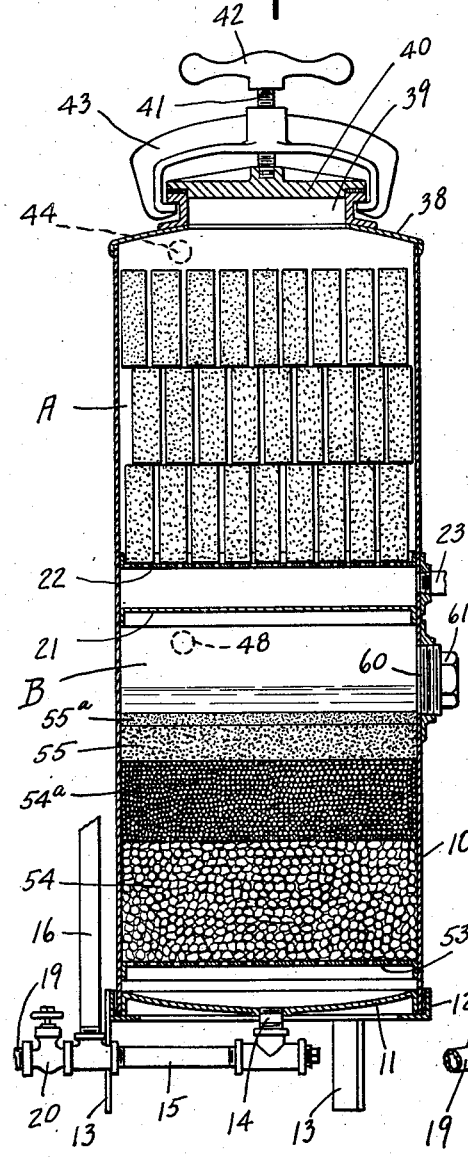
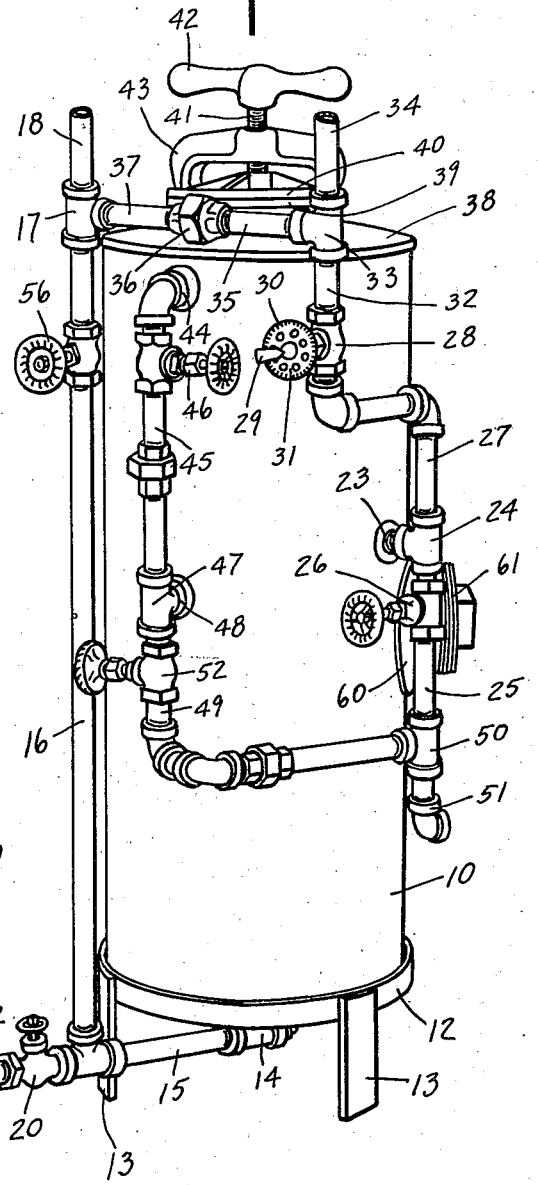
INVENTOR.
MARC LURIE.
BY Lockwood, Goldsmith & Galt,
ATTORNEYS.

Patented Jan. 16, 1945

2,367,228

UNITED STATES PATENT OFFICE 2,367,228

WATER RECTIFICATION

Marc Lurie, Indianapolis, Ind.

Application December 15, 1941, Serial No. 422,955

14 Claims. (Cl. 210—16)

This invention relates to a system of rectifying water to prevent lime deposition therefrom, and also to remove lime deposits in lines, boilers, and the like, to which the apparatus included in the system is connected when such apparatus is loaded with the lime preventing chemical composition.

The chief object of this invention is to so treat water that it may be used without depositing lime therefrom into boilers, lines, water heaters, et cetera, and which if included in a system which has been partially limed up, will incident to the use gradually remove from such system the previous lime deposits.

One feature of the invention consists in the apparatus utilized in the system.

Another feature of the invention consists in the chemical composition utilized in connection with the apparatus and in the form in which it is utilized and in its relationship and positioning in the apparatus.

Other objects and features of the invention will be set forth more fully hereinafter.

The full nature of the invention will be understood from the accompanying drawing and the following description and claims:

In the drawing,

Fig. 1 is a central sectional view through the singular unit illustrating in detail, the filter arrangement portion thereof and the chemical composition checkerboard arrangement thereof.

Fig. 2 is a more or less diagrammatic perspective view of the aforesaid unit and the connections thereto.

It has been found that if tetra-sodium pyrophosphate, a powder, sodium silicate, a liquid, and trisodium phosphate, a powder, are mixed together, as hereinafter described, and in certain proportions, the same will after several hours, set and harden to form in molds, which hardened units thereafter when subjected to water will gradually dissolve or wear away until the unit is finally exhausted. It has been found that a composition including approximately 80% of the pyrophosphate by weight, 15% of the silicate by weight, and 5% of the trisodium phosphate by weight, will produce such a unit.

In the preparation of such a unit, the sodium silicate and the trisodium phosphate are mixed together for about ten minutes and this forms a cream consistency. After this has been formed, the pyrophosphate is added with stirring and this is continued for about twenty minutes. The result is that the product attempts to solidify during this mixing and it balls up or lumps whereupon it is poured into a mold and left to harden. In about four hours the mixture sets up into a hard brick-like unit. Merely as a matter of convenience, these units have been made approximately 6" long and 2½" wide and deep.

Reference now will be had more particularly to Fig. 1. In Fig. 1, the numeral 10 indicates a cylindrical body portion which is provided with a dome shaped bottom 11 that seats in an angle section rim 12 provided with legs 13. The lower end of this dome shaped bottom 11 is connected to a line 14 that is brought out beneath the tank structure as at 15 and a riser 16 therefrom is connected to a T 17 above the elevation of the tank, and a line 18 therefrom is the discharge from the unit. The line 15 is provided with a valve controlled drain 19 provided with a shut off valve 20. When this valve 20 is opened and other valves are closed, the water in the filler chamber immediately above the dome shaped bottom 11 may be drained.

Midway between the top and the bottom of the cylindrical body portion 10 of the unit, there is an imperforate partition 21. This is a wall common to the filter chamber and the treating chamber thereabove. At a slight distance above wall 21 there is provided a perforated plate or screen 22. This screen has sufficient strength to support a considerable weight. Communicating directly with the space between the screen and the partition is an inlet 23. This inlet 23 communicates with a T 24, a depending branch 25 therefrom being controlled by the cutoff valve 26. The upwardly directed branch 27 includes therein the adjusting valve 28 having an indicator element 29 and a scale 30 carried by the movable portion 31 of the valve. By this means the degree of opening of the valve may be determined.

The supply line 32 connects to a T 33 and one branch thereof connects to the intake or supply line 34. The other branch of this T is connected by a line 35 to a union structure 36 in turn connected by a line 37 to the T 17. In effect, therefore, portions 35—36—37 constitute a direct connection between the supply line 34 and the discharge line 18.

Included in the coupling structure, or otherwise, in this so-called bypass, there is an apertured plate or like restricting element. The effective reduction is in the ratio of approximately one to four—that is the diameter of the opening of the restriction is about half of the effective diameter of the normal communication. While this restriction has been described as a perforated plate, the restriction may be formed by conventional reducer elements or means; hence, no illustration is believed necessary.

As shown clearly in Fig. 1, the several blocks or units of the chemical composition are stood upon end and approximately ¼" apart and after one layer has been placed upon the plate 22, a second layer is placed upon the first layer in offset relation but with approximately the same spacing between blocks in that second layer. The remainder of the volume of the upper chamber indicated by the letter A in Fig. 1 is similarly substantially filled with the mineral blocks.

It is to be understood the upper end of this cylindrical wall 10 is closed by a dome shaped top 38 and the same is provided with a manhole opening 39, as it were, and this opening provides the access to the chamber A for loading the chemical blocks in checkerboard relation therein. The manhole cover 40 or closure, is carried by the screw element 41 carrying the handle portion 42 and having threaded connection with the yoke 43 rigid with the dome top 38 or having an interlocking connection with a flange on the manhole opening defining portion so that as the handle portion 42 is screwed down, the yoke is rigidized, if not permanently secured, and as a result the manhole cover 40 is securely seated to close and seal the opening 39.

The chamber A near its upper end is provided with an outlet 44 and the line 45 therefrom includes the valve 46. Line 45 therefrom connects to a T 47, one branch of which leads to an intake 48 in the upper end of the chamber B formed beneath the imperforate partition 21 in the cylinder 10. The T 47 has a line 49 connected as at 50 to the line 25 and wasting as at 51. The line 49 includes shut-off valve 52.

Immediately adjacent or at the lower end of the cylinder 10 and in spaced relation to the dome bottom 11, there is provided a foraminated or perforated plate 53 which is capable of passing water and which is also capable of sustaining a considerable load. Thereabove there is positioned on and retained by said plate a layer of gravel 54. This gravel is graduated from coarse to fine, the latter being positioned near the top. Thereabove there is a layer of silica sand 55 and thereabove is a layer of fine quartz sand 55a. The approximate ratios of these materials is one, two and three, there being less of the finer material than there is of the coarser material. The upper level or top of the quartz layer is below the inlet 48 into chamber B. If desired, one additional valve 56 may be provided in the line 16.

As previously described, the valve 20 is never open unless the entire unit is to be drained. Normally, the valve 56 is open. The valve 46 is open. The valve 52 is closed. The valve 26 is closed and the valve 28 is open and to the desired degree.

Water under pressure is supplied by line 34 to the T 33 and part of it passes through the restrictive bypass structure described, to the T 17 and from thence by line 18 goes to the boiler, supply line, water heater, or the like. As previously stated, only about one-fourth of the water is so bypassed. The other water then enters the checkerboard chamber A through the intake 23 and passes upwardly through the perforated plate 22 and through the chemical block checkerboard arrangement therein and leaves the checkerboard chamber A as at 44 and immediately enters the top of the chamber B through the intake 48. It then passes through the filter arrangement and leaves by way of the bottom discharge 14 and lines 15 and 16 to the line 18.

Whenever it is desired to reload the chamber A, the valve 28 is closed and the valve 56 is closed. This takes all the pressure off of the unit. Then the valve 26 is opened and the water that is in the chamber A is wasted as at 51. Following this operation, the filler cap or manhole cover 40 is opened or removed and the blocks positioned in the chamber A in the checkerboard form. Following this operation, the valve 26 is closed and valve 56 is opened, and then the valve 28 is opened to the desired point indicated on the dial.

It will be observed that the cylinder 10 is provided with a lateral opening 60 and this is closed by a filler plug 61. This is positioned immediately below the imperforate partition 21 and constitutes the filter filling opening, whereby the filtering medium may be applied to the unit.

It will, of course, be obvious that the filter structure will require cleaning and for cleaning a sand filter, as is well known, cleaning is accomplished by washing through reverse flow. Accordingly, for cleaning the filter, the main supply valve 28 is closed. Also the supply valve 46 between the chemical chamber A and the filter chamber B is closed. The valve 26 remains closed. The valve 52 then is opened. The valve 56 remains open. Water then is supplied by line 34 through the bypass 35—36—37 and thence, to line 16 and the water reverses its flow in this line and line 15 and flows upwardly through the filtering material and gradually overflows through the opening 48 and thence, outwardly through the valve 52, line 49, T 50 and waste 51. Usually about five minutes of reverse flow are sufficient for such washing but in any event the reverse flow washing is continued until the water discharged from chamber B at 51 shows clear. When this occurs the valve 52 is closed, the valve 46 is again opened and the control valve 28 is reopened to the desired degree indicated on the dial.

The rectifier unit thereupon is again in service and ready for operation provided there is sufficient chemical composition in the chamber A. It is to be understood that by having the water enter the chemical chamber A at the bottom and overflow as it were, to the filtering chamber, the water, so treated in its passage, is substantially saturated with the chemical ingredients. If desired, the chamber A may be provided with a vision panel so that the extent of disintegration or solubility of the composition may be readily ascertained. The chemical material, as previously stated, when added to the water supplied, not only prevents the water depositing lime in the system, water heater, household lines, boilers and the like, but in addition thereto, sufficiently softens previously deposited lime therein so that this is dissolved as well.

Application of a unit as herein described, to a hot water heating system, it has been ascertained will substantially free the supply lines and the heating radiators from lime deposits so that the system, previously extremely insufficient thermally for heating purposes, may be reconditioned within a very short time and brought back to approximately its original thermal efficiency condition for heating purposes.

The chemical reactions are not understood. However, experimentation has determined these ingredients in approximately these proportions do cooperate and the resulting composition has a sufficiently satisfactory slow rate of solubility in the water supplied to the system to be subject to the treatment. It, of course, is to be understood that any system to which the apparatus is to be included is opened at the initial supply line and the herein disclosed apparatus included in that opening in such line and it might be stated that 34 and 18 would constitute the two portions of that opened arrangement of such original supply line.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A method of rectifying water to prevent lime deposition therefrom and to dissolve deposited lime, including bypassing a major portion of the water supply to and through a checkerboard arranged mass of blocks, each of slowly water soluble solidified lime deposition preventing chemical composition in large mass form having a low surface to volume ratio and each mass subject primarily to facial contact with the water and then through a filter before returning to the other portion of the water supply.

2. A water rectifier system including two storage chambers connected in series with the high end of one connected to the high end of the other, a supply line subject to water under pressure and connected to the low end of the first mentioned chamber, a line from the low end of the other chamber and constituting a discharge therefrom, a restrictive bypass between the pressure supply line and discharge line, a checkerboard arranged mass of blocks, each of slowly, water soluble, lime deposition preventing, solidified chemical composition in large mass form having a low surface to volume ratio and each mass subject primarily to facial contact with the water in the first chamber, and filtering material in the second chamber.

3. A water rectifier system, as defined by claim 2, characterized by the two chambers being continuations of each other, the two chambers each having a wall common to the other chamber.

4. A water rectifier system as defined by claim 2, characterized by a perforated plate in the first mentioned chamber adjacent the intake end thereof and constituting the support for the checkerboard arranged mass of blocks, water from the intake flowing upwardly through both.

5. A water rectifier system as defined by claim 2, characterized by the filtering material including superposed layers of sand and sized aggregate arranged for gravity water flow therethrough.

6. In a rectifier system, a single tank having an imperforate partition between the ends forming two chambers, one chamber having a filling opening in one end for the supply of solid material, a closure for the opening, the other chamber having a filling opening for the supply of solid material, a closure for the second opening, a foraminated plate near the lower end of each chamber for solid material support thereabove, means connecting the upper ends of the chambers, a supply line subject to liquid under pressure and connected to the lower end of one chamber and a line from the lower end of the other chamber and constituting a discharge therefrom, the pressure liquid flowing upwardly through the supply line connected chamber and overflowing to the other chamber, the overflowing liquid flowing by gravity through the other chamber to the discharge line therefrom.

7. A water rectifier system as defined by claim 6, including a restrictive bypass between the pressure liquid supply line and the discharge line for bypassing a minor portion of the liquid from the former to the latter and around the chambers.

8. A water rectifier system as defined by claim 6, characterized by the addition of a waste line connected to the said connecting means, a valve in the waste line, and a valve in said connecting means, the valves being differentially positionable, that is the second valve is open and the waste valve is closed for normal operation, and positioned reversely for permitting reverse flow for washing purposes.

9. A water rectifier system as defined by claim 6, including a restrictive bypass between the pressure liquid supply line and the discharge line for bypassing a minor portion of liquid from the former to the latter and around the chambers, a valve included in the discharge line ahead of the bypass connection thereto, and an adjustable valve in the pressure supply line.

10. A water rectifier system as defined by claim 6, including a restrictive bypass between the pressure liquid supply line and the discharge line for bypassing a minor portion of liquid from the former to the latter and around the chambers, an adjustable valve in the pressure supply line, a waste line therefrom beyond the bypass and adjustable valve and a valve in the waste line.

11. A water rectifier system as defined by claim 6, including a rectrictive bypass between the pressure liquid supply line and the discharge line for bypassing a minor portion of liquid from the former to the latter and around the chambers, a valve included in the discharge line ahead of the bypass connection thereto, and an adjustmeans, the valves being differentially positionable, that is the third valve is open and the waste in the waste line and a valve in said connecting means, the valves being differentially positionable, that is the third valve is open and the waste valve is closed for permitting normal operation, and reversely positioned for permitting reverse flow for washing purposes.

12. A water rectifier system as defined by claim 6, including a restrictive bypass between the pressure liquid supply line and the discharge line for bypassing a minor portion of liquid from the former to the latter and around the chambers, an adjustable valve in the pressure supply line, a waste line therefrom beyond the bypass and adjustable valve, a valve in said waste line, a waste line connected to the connecting means, a valve in the last mentioned waste line, and a valve in said connecting means, the two last mentioned valves being differentially positionable, that is the valve in said connecting means is open and the second waste line valve is closed for permitting normal operation, and reverse positioning of these two valves permitting reverse flow for washing purposes, the two valve controlled waste lines having a common connection downstream of one valve and upstream of the other valve.

13. A water rectifier system as defined by claim 6, including a restrictive bypass between the pressure liquid supply line and the discharge line for bypassing a minor portion of liquid from the former to the latter and around the chambers, a valve included in the discharge line ahead of the bypass connection thereto, an adjustable valve in the pressure supply line, a waste line therefrom beyond the bypass and adjustable valve, and a valve in said waste line.

14. A method of rectifying water including passing water circuitously through plurality of superposed layers offset relatively and each layer comprising a checkerboard arranged mass of blocks, each block being of slowly water soluble, solidified, chemical composition suitable for lime neutralizing rectification of water and in block form having a low surface to volume ratio, and each block subject primarily to facial contact with the water.

MARC LURIE.